United States Patent
Chen

[11] Patent Number: 6,060,865
[45] Date of Patent: May 9, 2000

[54] RAPID CHARGING OF A BATTERY BY APPLYING ALTERNATING PULSED LARGE CURRENT WITHOUT A HIGH TEMPERATURE

[75] Inventor: James Chin-Ming Chen, Tao-Yuan, Taiwan

[73] Assignee: Yuasa-Delta Technology, Inc., Hsinchu, Taiwan

[21] Appl. No.: 09/326,747

[22] Filed: Jun. 4, 1999

Related U.S. Application Data

[60] Provisional application No. 60/088,242, Jun. 5, 1998.

[51] Int. Cl.$^7$ ........................... H01M 10/44; H01M 10/46
[52] U.S. Cl. ............................................. 320/139; 320/141
[58] Field of Search .................................. 320/128, 137, 320/139, 141, 145, 149, 152, 162, 164

[56] References Cited

U.S. PATENT DOCUMENTS

| | | | |
|---|---|---|---|
| 5,311,113 | 5/1994 | Kojima | 320/148 |
| 5,367,244 | 11/1994 | Rose et al. | 320/141 |
| 5,412,306 | 5/1995 | Meadows et al. | 320/139 |
| 5,510,693 | 4/1996 | Theobald | 320/151 |
| 5,646,506 | 7/1997 | Suzuki | 320/145 |
| 5,694,023 | 12/1997 | Podrazhansky et al. | 320/145 X |

*Primary Examiner*—Edward H. Tso
*Attorney, Agent, or Firm*—Bo-In Lin

[57] ABSTRACT

The present invention discloses a method for charging a battery. The method includes the steps of (a) charging the battery by a constant charging current with a first magnitude as a first pulsed charge over a first pulse-period. Then, the method is followed by charging the battery with a constant charging current with a second magnitude, substantially lower than the first magnitude, as a second pulsed charge over a second pulsed-period. The method further includes a step of (b) repeating step (a) over a first charge cycle for rapidly charging the battery to a significant percentage of full capacity. In another preferred embodiment, the method further includes a step of (c) repeating steps (a) and (b) by lowering the first magnitude and the second magnitude of the charge currents and by adjusting the first pulsed-period and the second pulsed-period for charging the battery over a second charging cycle. In yet another preferred embodiment, the method further includes a step (d) of continuously repeating steps (c) by further lowering the first magnitude and the second magnitude of the charge currents and by adjusting the first pulsed-period and the second pulsed-period for charging the battery over subsequent charging cycles to fully charge the battery.

16 Claims, 1 Drawing Sheet

RAPID CHARGING OF A BATTERY BY APPLYING ALTERNATING PULSED LARGE CURRENT WITHOUT A HIGH TEMPERATURE

This application claims a Priority Date of Jun. 5, 1998, benefited from a previously filed Provisional Application 60/088,242 filed on Jun. 5, 1998 by a same Inventor of this patent application.

BACKGROUND OF THE INVENTION

1. Field of the Invention

This invention relates generally to the method and device for charging a rechargeable battery. More particularly, this invention relates to an improved method and device for accelerating the rate of charging a rechargeable battery without causing rapid increase of battery temperature.

2. Description of the Prior Art

Conventional methods of increasing the rate for charging a rechargeable-battery to achieve rapid-charge still encounter several limitations. One of the major difficulties is the problem of battery overheating resulting from rapid temperature rise during the process of a rapid charge operation. A large current flowing through the battery causes temperature to rise. This is due to the heat produced from a conversion of the electrical energy to a thermal energy in the form of "IR" where "R" represents the internal resistance of the battery, and "I" represents the charging current. With an increase in the charging current, larger amount of heat is produced. A potential damage to battery that may result from overheating caused by rapid temperature rise becomes a major concern. Particularly, when larger current is employed to rapidly charge the battery for the purpose of shortening the charging cycles.

A typical battery charging system is disclosed by Theobald et al. in U.S. Pat. No. 5,510,693 entitled "Method of Battery Charging" (Issued on Apr. 23, 1996) a battery charging process. Three charging rates are applied. The initial rate of a one-capacity charging rate, i.e., a charging rate C, for charging the battery until the temperature of the battery reaches a certain level. The charger then changes to a trickle charge rate of C/8 to finish the charging of the battery. Then the charger reduces the charging rate to C/40 to maintain the battery's charge. The process then monitors the voltage of the battery. If the voltage indicates that the battery is being discharged, then the charging rate is returned to a trickle-charging rate of C/8. The length of time required to charge the battery to the full capacity may take one hour or even longer when a charging rate C is applied. Such a system and process would not able to satisfy a rapid charging requirement.

A common technique to rapidly charge the batteries by applying a charging system as disclosed by Theobald et al. is to charge it with a large constant current A voltage detecting circuit is attached to the battery to monitor the rate of battery voltage increase, i.e., $\Delta V/\Delta\Delta T$. Where $\Delta V$ represents the voltage variation and $\Delta\Delta T$ represents a unit-length of charging time. The voltage detecting circuit then determine a point in time when $\Delta V/\Delta T$ is zero. At that point, the battery is fully charged. There is a tendency for the voltage to decrease slightly because usually the battery would be overcharged when a large current is applied. The charging operation is terminated based on a determination of the rate of change of $\Delta V$ when it is detected that $\Delta V/\Delta T$ is zero.

This technique has several limitations. The first limitation is the length of time it requires to fully charge the batteries. Due to the concern of battery overheating, typically, the charging current is limited to a magnitude of "1C". Suppose that the full capacity of a battery is 1200 mah, i.e., 1200 millie-ampere-hour, then the "1C" charging current is 1.2 amperes. Approximately one hour would be required to fully charge the battery when a 1C-charge current is applied. In order to accurate detect the time when $\Delta V/\Delta\Delta T$ becomes zero, a high precision detection circuit is required. The voltage variations for a typical 1.2V battery over the charging time are approximately 50mV to 150mV. In order to prevent overcharge, it is necessary to apply more expensive and high precision detection circuits. Even with a high precision detection circuit, it is often inevitable that the battery may be overcharged. This overcharge phenomenon is caused by a delay of $\Delta V/\Delta\Delta T$ response. When charged by a large current, the $\Delta V$ response of the battery tend to delay two to three minutes in reaction to the large charge current even that the battery is fully charged. The battery is under an overcharge condition in these two to three minutes. The life of the batteries is shortened when continuously charged by applying a $\Delta V/\Delta\Delta T$ technique due to this overcharge phenomenon. In order to avoid the overcharge, the charge current may be terminated slightly earlier before $\Delta V/\Delta\Delta T$ becomes zero. However, such practice sacrifices the capacity of the batteries to exchange for the benefits of rapid charge. More frequent charging operations would become necessary become the battery is operated under their full capacity. The life of the batteries again may be adversely affected due to more frequent charging operations.

In order to overcome these difficulties, many techniques are disclosed in prior art patents to improve the rapid charging performance. In U.S. Pat. No. 5,311,113, entitled "Method of Setting Peak-Timer of Electric Charger", Kojima discloses a method for charging a battery by applying a rapid charge voltage level and a trickle charge voltage level. The charger is provided with a total timer for measuring a total elapse-time starting from the initiation of a charging operation. The charger further includes a peak-timer for measuring an amount of elapse-time since the peak voltage is reached during rapid charging of the battery. An arithmetic circuit is employed in the peak-timer for determining the elapse-time since the peak voltage is reached as a function of the total elapse-time and the charging rate. This method of setting peak-timer of an electric charger may provide more accurate control of adjusting the time after the peak voltage is reached. However, a rapid charging operation may still limited by the difficulties that long charging time is required. Also, it is not clear whether a measurement of the peak-timer, as disclosed in this patent, can assist a charging operation to prevent battery damages caused by high temperature, especially during a rapid charging process. Using this patented peak-timer does not solve the difficulties faced by those of ordinary skill in the art for rapidly charging a battery.

Sage discloses in another U.S. Pat. No. 5,663,574, entitled "Pulse-Charge Battery Charger" (issued on May 27, 1997), a pulse-charge battery charger for charging nickel cadmium and nickel-metal hydride batteries. The charger includes a power supply system to provide full wave rectified unregulated DC volt power source and regulated 5 DC volt power source. The charger further includes a time control circuit and a temperature detection unit. A typical charging cycle is described as 1000 milliseconds of charging; 2 milliseconds of no charging; 5 milliseconds of discharging; 10 milliseconds for a second no charging period. The charging cycle is performed until the battery is fully charged. The charger, as disclosed, implements complicated temperature and time control scheme by constantly monitoring and feeding back the voltage, temperature, charging time and charging current variations to adjust the charging cycles. Due to the fact that the charging operations are relying heavily on the controlling and monitoring circuits implemented in the charger, expensive and high precision circuits are required to carry out such charge operations. Additionally, the overheating and overcharge problems associated with the $\Delta V/\Delta\Delta T$ techniques may still occur when the charge operation is dependent on the measurements of the condition of a battery when there is delay of the battery in reaction to the charging process.

Therefore, a need still exists in the art of rapid charging of a battery to provide a simplified and effective method to overcome the above discussed problems and difficulties. It is desirable that such methods should be simple and practical. It is further desirable that the method does not depends on high-precision and expensive measuring circuits such that rapid charging operations can be carried out economically in regular daily operations.

SUMMARY OF THE PRESENT INVENTION

It is therefore an object of the present invention to provide a new battery charging method to increase the charging rate of the battery without unduly raise the temperature. The new charging method can be carried out by a simple and practical charging system without requiring more expensive high precision monitoring and detecting circuits as that often employed in the prior art for rapid charging. The method of this invention would enable those of ordinary skill in the art to overcome the aforementioned difficulties and limitations encountered in the prior art.

Specifically, it is an object of the present invention to provide a new battery charging method implemented with simple charging systems to significantly reduce the required charging time. The rapid charging operation of the battery is achieved by repeating a gradually reduced periodic pattern of charging voltages. The periodic pattern includes alternating short-pulsed high-voltage typically of a few seconds followed by a short pulsed-low voltage of few seconds. Such gradually reduced periodic patterns are repeated to rapidly charge the battery without causing a high temperature.

Another object of the present invention is to provide a new and simplified method for rapidly charging a rechargeable battery to significant reduce the required charging time. The new method is simple and can be implemented with economic charging systems and can be employed as daily regular operations without requiring a high cost device.

Another object of the present invention is to provide a new and improved rapid charging method for charging the battery to prevent overcharging and overheating of batteries. Battery can be charged with significantly reduced charging time while the life and performance are improved by applying the charging method disclosed in this invention.

Briefly, in a preferred embodiment, the present invention discloses a method for charging a battery. The method includes the steps of (a) charging the battery by a constant charging current with a first magnitude as a first pulsed charge over a first pulse-period. Then, the method is followed by charging the battery with a constant charging current with a second magnitude, substantially lower than the first magnitude, as a second pulsed charge over a second pulsed-period. The method further includes a step of (b) repeating step (a) over a first charge cycle for rapidly charging the battery to a significant percentage of full capacity. In another preferred embodiment, the method further includes a step of (c) repeating steps (a) and (b) by lowering the first magnitude and the second magnitude of the charge currents and by adjusting the first pulsed-period and the second pulsed-period for charging the battery over a second charging cycle. In yet another preferred embodiment, the method further includes a step (d) of continuously repeating steps (c) by further lowering the first magnitude and the second magnitude of the charge currents and by adjusting the first pulsed-period and the second pulsed-period for charging the battery over subsequent charging cycles to fully charge the battery.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
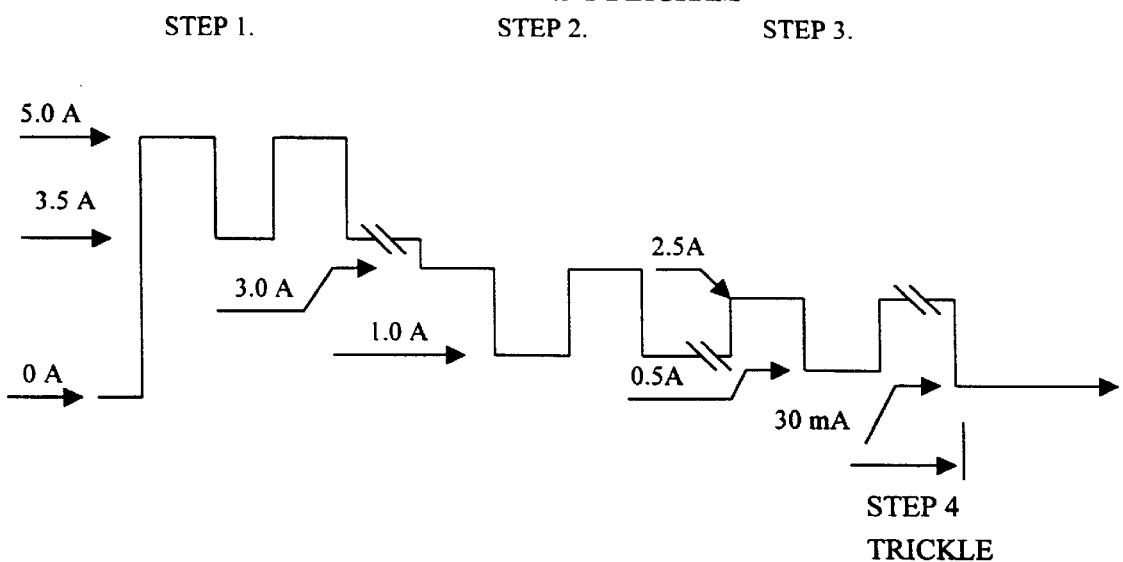
FIG. 1 is a timing diagram for illustrating the variations of charging voltages as a function of time to rapidly charge a battery according to a preferred embodiment of this invention.

FIG. 1 is a timing diagram to show the variation of a charging current as a function of time based on a method of the present invention. The method of rapid battery charging is based on a method of alternating pulsed high and low charging voltages. The magnitudes of the high and low alternating pulsed voltages are gradually decreasing as the battery is becoming more charged. The charging method can be applied to either nickel-cadmium or nickel hydride metal types of rechargeable batteries. As an example for illustration, the battery for rapid charging is a 1200 mah battery. The charging operation begins with a charging current of 4.16 C, i.e., 5 amperes, for two seconds. Then, it continues by applying a pulsed lower current of 2.91 C, i.e., 3 amperes, for two seconds. This pattern of alternating pulsed charging currents with high-and-low magnitudes is repeated for ten minutes or until the time when the voltage of the battery reaches a level of 1.6 volts per cell. The charging operation continues by repeating this alternating high-and-low pulsed charging currents with reduced magnitudes. Specifically, as shown in FIG. 1, a charging current of 2.5 C, i.e., 3 amperes, is applied for seconds, followed by a charging current of 0.83 C, i.e., one ampere, for two seconds. This pattern of alternating pulsed high-low-charging currents with reduced magnitudes is repeated for two minutes or continued until the cell voltage reaches a level of 1.56 volts/cell. A similar pattern of alternating pulsed high-low charging currents of 2.08 C, i.e., 2.5 amperes, for two seconds followed by 0.416 C, i.e., 0.5 ampere, for two seconds, is applied. This process may continue until about twenty-five minutes of the charging operation or until the time when the battery is fully charged. Then, a trickle charge of 30 mA is applied continuously.

In this above example, the total charging time is reduced significantly, e.g., more than 50% savings of charging time. By applying the alternating high-low pulsed voltages as shown above, an overheating of the battery due to rapid rise of battery temperature during a charge operation can be avoided. A low charge current soon follows a higher rate of temperature increase, during the time when battery is charged with a high current. A relief period is provided for the battery to absorb the thermal energy generated during the period when the battery is charged by the pulsed high charge current An overheating phenomenon can be avoided because the battery is not charged continuously with a high current Based on FIG. 1 and the above description, this invention discloses a method to rapidly charge a battery having a fully charged capacity of C mah (millie-ampere-hour) where C is a real number. The method includes the steps of (a) charging the battery by a first constant charging current C1 amperes over a first pulse-period T1 seconds wherein C1=M1*C and M1 and T1 are a real numbers and M1 is greater than 1.0, followed by charging the battery with a second constant charging current C2 ampere over a second pulsed-period T2 seconds wherein C2=M2*C and M2 and T2 are real numbers and M2 is greater than 1.0 and smaller than M1; and (b) repeating step (a) over a first charge cycle of TCC1 minutes wherein TCC1 is a real number for rapidly charging the battery to a significant percentage of the fully capacity C. In a preferred embodiment, the method further includes a step of (c) repeating steps (a) and (b) by lowering the first charging current and the charging current by reducing M1 and M2 and by adjusting the first pulsed-period T1 and the second pulsed-period T2 for charging the battery over a second charging cycle TCC2 minutes where TCC2 is a real number. In another preferred embodiment, the method further includes a step of (d) continuously repeating steps (c) by further lowering the first and the second charging currents by further reducing the M1 and M2 and by adjusting the first pulsed-period T1 and the second pulsed-period T2 for charging the battery over a subsequent m charging cycles TCCm, where m is a positive integer and TCCm is a real number. In another preferred embodiment, the method further includes a step of (e) trickle charging the battery with a trickle charging current of Ct=Mt* C where Mt is a real number substantially smaller than 1.0 to fully charge the battery. In another preferred embodiment, the step (a) is a step of charging the battery by the first constant charging current C1=M1*C amperes with the M1 ranging about 2.0 to 7.0, and charging the battery by the second constant charging current C2=M2*C amperes with the M2 ranging about 50% to 85% of M1. In another preferred embodiment, the step (d) of continuously repeating steps (c) by further lowering the first and the second charging currents by further reducing the M1 and M2 is a step of reducing the M2 to a real number substantially smaller than 1.0.

In summary, this invention discloses a method of charging a battery, the method includes a step of: a) charging the battery over several charging cycles with each charging cycle comprising a repeated pattern of applying a first charging current over a first pulse period followed by a lower second charging current over a second pulse period, wherein the first charging current and the second charging current are gradually reduced over each subsequent charging cycle. In a preferred embodiment, the method further includes a steps of (b) trickle charging the battery with a trickle charging current to fully charge the battery.

This invention further discloses a battery charger for charging a battery having a fully charged capacity of C mah (millie-ampere-hour) where C is a real number. The battery charger includes a charge-current controller for providing a first constant charging current C1 amperes over a first pulse-period T1 seconds wherein C1=M1*C and M1 and T1 are a real numbers and M1 is greater than 1.0, followed by providing a second constant charging current C2 ampere over a second pulsed-period T2 seconds wherein C2=M2*C and M2 and T2 are real numbers and M2 is greater than 1.0 and smaller than M1. The charge-current controller further includes a charge cycle control means for repeatedly providing the first and second charging currents over a first charge cycle of TCC1 minutes wherein TCC1 is a real number for rapidly charging the battery to a significant percentage of the fully capacity C. In a preferred embodiment, the charge cycle control means further includes a means for lowering the first charging current and the charging current by reducing M1 and M2 and by adjusting the first pulsed-period T1 and the second pulsed-period T2 for charging the battery over a second charging cycle TCC2 minutes where TCC2 is a real number. In another preferred embodiment, the charge-cycle control means further includes a means for lowering the first and the second charging currents by further reducing the M1 and M2 and by adjusting the first pulsed-period T1 and the second pulsed-period T2 for charging the battery over a subsequent m charging cycles TCCm, where m is a positive integer and TCCm is a real number. In another preferred embodiment, the charge cycle control means further includes a means for trickle charging the battery with a trickle charging current of Ct=Mt* C where Mt is a real number substantially smaller than 1.0 to fully charge the battery. In another preferred embodiment, the charge current controller further includes a means for providing the first constant charging current C1=M1*C amperes with the M1 ranging about 2.0 to 7.0, and providing the second constant charging current C2=M2*C amperes with the M2 ranging about 50% to 85% of M1. In another preferred embodiment, the charge cycle control means further includes a means for lowering the first and the second charging currents by reducing the M2 to a real number substantially smaller than 1.0.

In summary, a battery charger is disclosed in this invention. The battery charger includes a charge current controller for charging a battery over several charging cycles by generating in each charging cycle a repeated pattern of a first charging current over a first pulse period followed by a lower second charging current over a second pulse period, and for gradually reducing the first charging current and the second charging current over each subsequent charging cycle. In another preferred embodiment, the battery charger further includes a trickle charging means for charging the battery with a trickle charging current to fully charge the battery.

This method and battery charging apparatus provide a benefit of applying alternating pulsed high-low charging currents with higher magnitudes limited only by maximum temperature of the battery. Very rapid battery charging to 80% or more of the full capacity can be achieved in very short period of time. Then a pattern of alternating pulsed high-low charging currents of much lower magnitudes can be applied. Such charging practice is much safer. Lower risk of overcharging or overheating of the battery will occur because much lower charging current are applied during the last ten percent of the charging capacity. Shorter pulses of high current charging cycles during the initial charging period also allows the maintenance of a relatively low battery temperature.

Therefore, the present invention provides a new battery charging method to increase the charging rate of the battery without unduly raise the temperature. The new charging method is carried out by a simple and practical charging system without requiring more expensive high precision monitoring and detecting circuits as that often employed in the prior art for rapid charging. The method of this invention enables those of ordinary skill in the art to overcome the difficulties and limitations encountered in the prior art. Specifically, a new battery charging method implemented with simple charging systems to significantly reduce the required charging time is disclosed. The rapid charging operation of the battery is achieved by repeating a gradually reduced periodic pattern of charging currents. The periodic pattern includes alternating short-pulsed high-charge currents typically of a few seconds followed by a short pulsed-low current of few seconds. Such gradually reduced periodic patterns are repeated to rapidly charge the battery without causing a high temperature. The new method is simple and can be implemented with economic charging systems and can be employed as daily regular operations without requiring a high cost device. This improved rapid charging method is able to quickly charge a battery without overcharging and overheating the battery. A battery can be charged with significantly reduced charging time while the life and performance are improved by applying the charging method disclosed in this invention.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A method for charging a battery having a fully charged capacity of C mah (millie-ampere-hour) where C is a real number comprising:

(a) charging said battery by a first constant charging current C1 amperes over a first pulse-period T1 seconds wherein $C1=M1*C$ and M1 and T1 are a real numbers and M1 is greater than 1.0, followed by charging said battery with a second constant charging current C2 ampere over a second pulsed-period T2 seconds wherein $C2=M2*C$ and M2 and T2 are real numbers and M2 is greater than 1.0 and smaller than M1;

(b) repeating step (a) over a first charge cycle of TCC1 minutes wherein TCC1 is a real number for rapidly charging said battery to a significant percentage of said fully capacity C.

2. The method of charging a battery as recited in claim 1 further comprising:

(c) repeating steps (a) and (b) by lowering said first charging current and said charging current by reducing M1 and M2 and by adjusting said first pulsed-period T1 and said second pulsed-period T2 for charging said battery over a second charging cycle TCC2 minutes where TCC2 is a real number.

3. The method of charging a battery as recited in claim 2 further comprising:

(d) continuously repeating steps (c) by further lowering said first and said second charging currents by further reducing said M1 and M2 and by adjusting said first pulsed-period T1 and said second pulsed-period T2 for charging said battery over a subsequent m charging cycles TCCm, where m is a positive integer and TCCm is a real number.

4. The method of charging a battery as recited in claim 2 further comprising:

(e) trickle charging said battery with a trickle charging current of $Ct=Mt*C$ where Mt is a real number substantially smaller than 1.0 to fully charge said battery.

5. The method of charging a battery as recited in claim 1 wherein:

said step (a) is a step of charging said battery by said first constant charging current $C1=M1*C$ amperes with said M1 ranging about 2.0 to 7.0, and charging said battery by said second constant charging current $C2=M2*C$ amperes with said M2 ranging about 50% to 85% of M1.

6. The method of charging a battery as recited in claim 3 wherein:

wherein said step (d) continuously repeating steps (c) by further lowering said first and said second charging currents by further reducing said M1 and M2 is a step of reducing said M2 to a real number substantially smaller than 1.0.

7. A method for charging a battery comprising a step of:

a) charging said battery over several charging cycles with each charging cycle comprising a repeated pattern of applying a first charging current over a first pulse period followed by a lower second charging current over a second pulse period, wherein said first charging current and said second charging current are gradually reduced over each subsequent charging cycle.

8. The method of charging a battery as recited in claim 7 further comprising:

(b) trickle charging said battery with a trickle charging current to fully charge said battery.

9. A battery charger for charging a battery having a fully charged capacity of C mah (millie-ampere-hour) where C is a real number comprising:

a charge-current controller for providing a first constant charging current C1 amperes over a first pulse-period T1 seconds wherein $C1=M1*C$ and M1 and T1 are a real numbers and M1 is greater than 1.0, followed by providing a second constant charging current C2 ampere over a second pulsed-period T2 seconds wherein $C2=M2*C$ and M2 and T2 are real numbers and M2 is greater than 1.0 and smaller than M1;

said charge-current controller further includes a charge cycle control means for repeatedly providing said first and second charging currents over a first charge cycle of TCC1 minutes wherein TCC1 is a real number for rapidly charging said battery to a significant percentage of said fully capacity C.

10. The battery charger as recited in claim 9 wherein:

said charge cycle control means further includes a means for lowering said first charging current and said charging current by reducing M1 and M2 and by adjusting said first pulsed-period T1 and said second pulsed-period T2 for charging said battery over a second charging cycle TCC2 minutes where TCC2 is a real number.

11. The battery charger as recited in claim 10 wherein:

said charge-cycle control means further includes a means for lowering said first and said second charging currents by further reducing said M1 and M2 and by adjusting said first pulsed-period T1 and said second pulsed-period T2 for charging said battery over a subsequent m charging cycles TCCm, where m is a positive integer and TCCm is a real number.

12. The battery charger as recited in claim 9 wherein:

said charge cycle control means further includes a means for trickle charging said battery with a trickle charging current of $Ct=Me\ C$ where Mt is a real number substantially smaller than 1.0 to fully charge said battery.

13. The battery charger as recited in claim 9 wherein:

said charge current controller further includes a means for providing said first constant charging current C1=M1*C amperes with said M1 ranging about 2.0 to 7.0, and providing said second constant charging current C2=M2*C amperes with said M2 ranging about 50% to 85% of M1.

14. The battery charger as recited in claim 11 wherein:

said charge cycle control means further includes a means for lowering said first and said second charging currents by reducing said M2 to a real number substantially smaller than 1.0.

15. A battery charger comprising:

a charge current controller for charging a battery over several charging cycles by generating in each charging cycle a repeated pattern of a first charging current over a first pulse period followed by a lower second charging current over a second pulse period, and for gradually reducing said first charging current and said second charging current over each subsequent charging cycle.

16. The battery charger as recited in claim 15 further comprising:

a trickle charging means for charging said battery with a trickle charging current to fully charge said battery.

* * * * *